United States Patent [19]
Schober et al.

[11] 3,825,765
[45] July 23, 1974

[54] PHOTOELECTRIC SURFACE SCANNING DEVICE

[75] Inventors: Helmut Schober, Taufkirchen; Bernd Marquardt, Munich, both of Germany

[73] Assignee: Firma Erwin Sicke Optik-Electronik, Waldkirch, Germany

[22] Filed: Sept. 17, 1973

[21] Appl. No.: 397,813

[30] Foreign Application Priority Data

Sept. 14, 1972 Germany............................ 2245058

[52] U.S. Cl................................... 250/563, 356/200
[51] Int. Cl............................................ G01n 21/38
[58] Field of Search............. 250/562, 563; 356/200

[56] References Cited

UNITED STATES PATENTS 3,198,951 8/1965 Lentze................................ 250/563

*Primary Examiner*—James W. Lawrence
*Assistant Examiner*—T. N. Grigsby
*Attorney, Agent, or Firm*—Darbo, Robertson & Vandenburgh

[57] ABSTRACT

The signal from the photoelectric detector is employed by an electronic flaw analyzer only during the time that the light beam is sweeping across the surface to be examined. That signal is cut off from the flaw analyzer during the times that the light beam passes beyond the edges of the surface being examined. During these periods of cutoff, the flaw analyzer is supplied with a stored signal which stored signal was formed by taking the mean of a previous signal from the photoelectric detector.

5 Claims, 3 Drawing Figures

PHOTOELECTRIC SURFACE SCANNING DEVICE

BACKGROUND AND SUMMARY OF THE INVENTION

This invention relates to a photoelectric surface scanning device, in which a scanning light beam passes in a plurality of parallel lines over a strip surface being analyzed as to flaws. There is a photoelectric detector responding to the light reflected (or transmitted) by the strip surface. The signal from the detector goes to a differentiating element and an analyzer circuit with digital output for the error analysis. There is a signal lock for the digital output signals of the analyzer circuit, which becomes effective when the scanning light beam leaves the strip surface being scanned and, after a non-operative time, becomes ineffective to block the output signals when the scanning light beam again passes onto the strip surface in the next following line.

In most such devices the scanning light beam will leave the surface being examined at the end of each pass across that surface. As it does so the beam impinges on the support for the surface being scanned and as a result of this transition there can be changes in the reflected light which changes will appear to the scanning device to be the result of flaws. For this reason the prior art has used signal locks which prevent the transfer of error signals during the non-operative time during which the beam is not on the strip surface. For circuitry reasons it is to be preferred to provide this signal lock for error signals on the digital side, thus behind the analyzer circuit, where this signal lock can, for instance, be constituted by a simple AND-element which is energized by a flip-flop.

The analysis of the detector signals is effected via a differentiating element in order to obtain an error rise as compared with the noise ripple of the surface. Though the error indications caused by the transitions between background and surface being scanned are suppressed they only fade slowly however. Also, in order to detect errors of slowly changing brightness, the differentiating element includes coupling elements of a relatively large time constant, so that low frequencies are also transferred. Due to the great transitional changes of the light current at the detector and of the signal at the differentiating element, thus, only slowly fading pulses are generated which override the succeeding amplifier. This leads to interferences or prevents flaw recognition at the margin of the sample.

For this reason, an arrangement has already been provided in which a stronger differentiation (at smaller time constant) can be effected during the non-operative time, i.e. when the signal lock is effective, than in the phase during which the surface scanning device is ready to operate. Such an encroachment on the differentiating element is difficult and can only alleviate, but not eliminate the described problems.

It is an object of this invention to provide a photoelectric surface scanning device which operates with a fixed differentiating element, yet which will not supply erroneous flaw indications as the scanning beam leaves the edges and which will render possible a flaw recognition as far as the margins.

According to the invention this object is solved by providing that, via a circuit arrangement including a storage element and a switch actuated synchronously with the signal lock, the signal from the detector is supplied to the differentiating element during scan of the strip surface and during the non-operative time a detector signal stored in a storage element during the preceding scanning period is applied to the differentiating element.

Due to the connection of the stored signal to the input of the differentiating element it is generally possible to prevent the production of error pulses which otherwise would occur by the transitions at the beginning and at the end of the non-operative time, since, at such times, the input signal at the differentiating element changes only irrelevantly.

The invention can be realized advantageously in such a manner that the circuit arrangement includes an RC-element for taking the mean, to which the detector signal is applied via a switch only during the scanning period, and that, by a second switch, during the scanning period the detector signal and during the non-operative time the mean value is connected through to the differentiating element. The differentiating element may be preceded by an impedance transducer. The time constant of the RC-element may approximately correspond to the time of one traverse of the scanning light beam.

DESCRIPTION OF SPECIFIC EMBODIMENT

Figure 1:
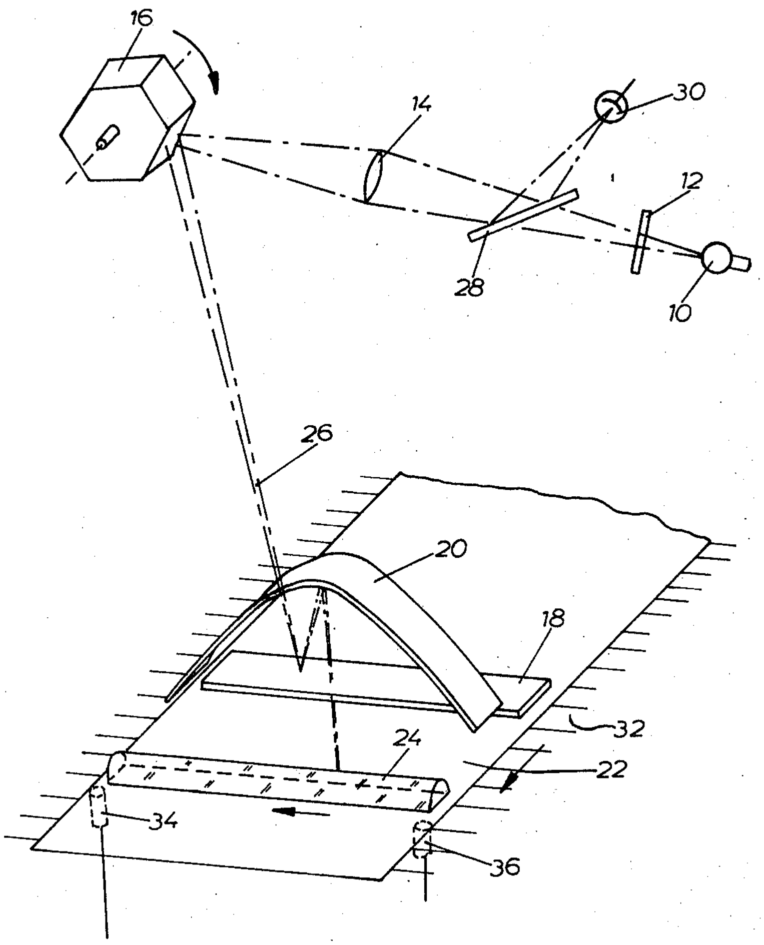
FIG. 1 is a diagrammatic perspective view of a surface scanning device with which the present invention would be employed.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Light from a light source 10 shines through a slit 12. An objective 14 focuses the light from the slit via a rotating polygonal mirror 16, a plane mirror 18 and a concave mirror strip 20 onto a strip surface 22 being scanned. Extending transversely across the strip surface is a cylindrical lens 24 which concentrates the light from the slit to a sharp light spot. Due to the rotation of mirror 16 this light spot periodically passes transversely across the strip. In turn, the strip is continuously advanced in a direction of the arrow. Thus there is a line scan of the strip surface by the scanning light beam 26 along a plurality of parallel lines. The light reflected by the strip surface into the direction of incidence returns via the mirrors 20, 18, 16 and the objective 14. From the objective 14 it strikes a partially transmitting mirror 28 inclined in the path of rays and is directed onto a photoelectric detector 30. The arrangement may, for instance, be designed in the manner of the U.S. Pat. No. 3,062,965.

During the scanning movement the scanning light beam does not only pass over the strip surface 22 being scanned to detect flaws therein, but also over the background 32 at the beginning and end of each line, since, of course, the scanning width cannot be adapted accurately to the strip width. Due to jumps in intensity occurring at the edges of the strip 22 flaws can be simulated. Therefore, photoelectric detectors 34, 36 are provided at the strip edges. The scanning light beam 26 impinges on these detectors and they supply signals to produce a suppression of the flaw detection signals during the non-operative time during which the scanning light beam 26 is over the background 32.

Figure 2:
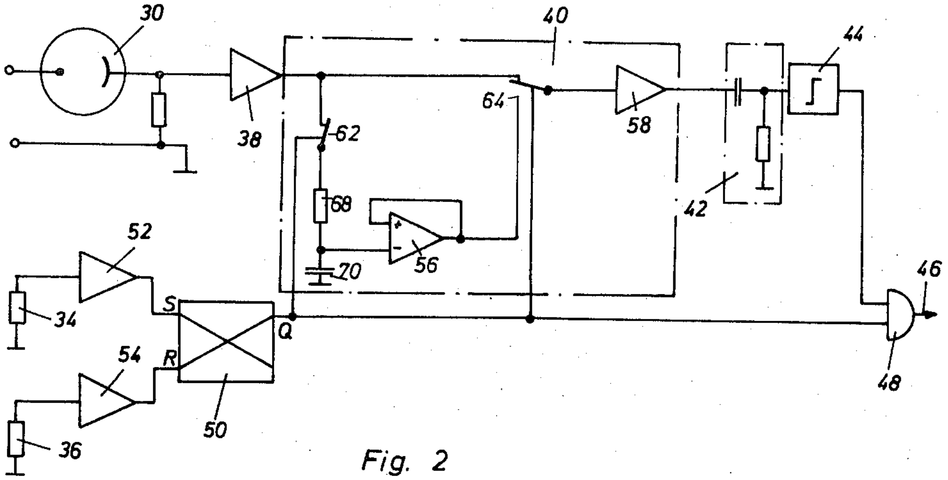
FIG. 2 is a circuit diagram of a scanning device embodying the invention.

The circuit is illustrated in FIG. 2. The signal of the photoelectric detector 30 is applied to a differentiating element 42 of fixed time constant via an impedance transducer 38 and a transfer circuit 40. The differentiated signal is applied to an analyzer circuit 44 which for input signals below a preset threshold supplies "O" output and switches to an output "L", if the differentiated detector signal exceeds the threshold and thus signals a flaw to be detected.

For the purpose of suppression the output signal of the analyzer circuit is supplied to a signal output 46 via a signal lock in the form of an AND-element 48. One input of the AND-element is connected to the output of the analyzer circuit 44. The second input of the AND-element 48 has an output of a flip-flop 50 connected thereto. This flip-flop has its two inputs S and R energized by the photoelectric detectors 34 and 36 via pulse formers 52 and 54 respectively. The detector 34 initially sets the flip-flop 50, while the detector 36 resets it at the end of the scanning period. During the scanning period, i.e. when the scanning light beam 26 is passing over the strip surface being examined, the flip-flop 50 supplies an L signal to the second input of the AND-element 48. Thus if there is an error signal at the output of the analyzer circuit 44 it passes through AND-gate 48 to the signal output 46. During the non-operative time, i.e. when the scanning light beam 26 passes over the background 32, there is an O signal from the flip-flop 50 to the AND-element and the latter blocks the occurring error signals from reaching the output 46.

The transfer circuit 40 includes an RC-element comprising resistor 68 and capacitor 70 for taking the mean. This RC-element 68, 70 has a time constant which corresponds to the time of a traverse of the scanning light beam 26. Switch 62 is controlled by the flip-flop 50 so that the mean is only taken during the scanning period. This mean is transmitted through a separating amplifier 56 to an analog-switch 64. The analog-switch is controlled by the flip-flop 50 to alternatively supply the detector signal or the mean to an impedance transducer 58 preceding the differentiating element 42.

The circuit arrangement 40 operates as follows: During the scanning period the switch 64 is positioned to supply the detector signal to the impedance transducer 58. Switch 62 is closed. The mean is taken with the RC-element 68, 70. The capacitor 70 also stores the mean for the non-operative time. When the scanning period ends, switch 62 opens and switch 64 moves to the other contact. The mean from capacitor 70 is thus supplied to the impedance transducer 58 through switch 64. The impedance transducer 58 applies signal *f* (FIG. 3) to the differentiating element 42.

Figure 3:
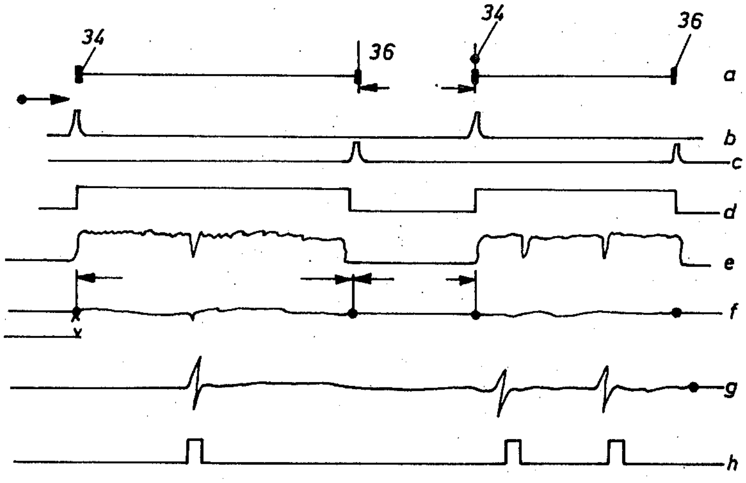
FIG. 3 illustrates the signal waveforms in the various points of the circuit.

Lines *a* to *h* of FIG. 3 illustrate the signal waveforms. Line *a* in FIG. 3 shows the relationship between scanning period (the horizontal line between 34 and 36) and non-operative time (the gap between 36 and 34). Lines *b* and *c* show the signals of the detectors 34 and 36 respectively. Line *d* illustrates the state of the flip-flop 50. Line *e* illustrates a typical signal waveform of the detector signal. Line *f* shows the waveform of the signal at the input of the differentiating element 42. Line *g* shows the differentiated signal from which the analyzer circuit 44 generates rectangular pulses, illustrated in line *h*, for the error indication.

We claim:

1. In a photoelectric surface scanning device, in which a scanning light beam is passed in lines over a strip surface being analyzed as to flaws, and including a photoelectric detector responding to the light from the strip to produce detector signals, a differentiating element and an analyzer circuit with digital output for the error analysis, and a signal lock for the digital output signals of the analyzer circuit, which lock becomes effective when the scanning light beam leaves the strip surface being scanned and after a non-operative time becomes ineffective when the scanning light beam again passes onto the strip surface in the next following line, the improvement comprising:

a transfer circuit connected between the detector and the differentiating element and connected to said signal lock, said transfer circuit including a signal storage element and switch means for supplying said detector signals to the differentiating element during the period of time that said strip surface is being scanned, and for supplying stored detector signals to said differentiating element during the time that said scanning light beam is not on said strip surface.

2. In a device as set forth in claim 1, wherein said transfer circuit includes an RC-element for taking the mean of the detector signals and supplying said mean detector signals to the storage element to be stored therein.

3. In a device as set forth in claim 2, including impedance transducer means connected ahead of said differentiating element.

4. In a device as set forth in claim 3, wherein said RC-element has a time constant which approximately corresponds to the time of one traverse of the scanning light beam.

5. In a device as set forth in claim 2, wherein said RC-element has a time constant which approximately corresponds to the time of one traverse of the scanning light beam.

* * * * *

UNITED STATES PATENT OFFICE

CERTIFICATE OF CORRECTION

Patent No. 3,825,765 Dated July 23, 1974

Inventor(s) Helmut Schober, Bernd Marquardt and Ernst Gass

It is certified that error appears in the above-identified patent and that said Letters Patent are hereby corrected as shown below:

The identification of Inventors should read:

Helmut Schober, Taufkirchen;
Bernd Marquardt, Wolfratshausen, and
Ernst Gass, Munchen, all of Germany The name of the Assignee should read:

Firma Erwin Sick

Signed and sealed this 5th day of November 1974.

(SEAL)
Attest:

McCOY M. GIBSON JR.
Attesting Officer

C. MARSHALL DANN
Commissioner of Patents

RM PO-1050 (10-69)

USCOMM-DC 60376-P69
☆ U.S. GOVERNMENT PRINTING OFFICE : 1969 O—366-334.